United States Patent [19]

Finkelstein et al.

[11] Patent Number: 5,283,775
[45] Date of Patent: Feb. 1, 1994

[54] SPLIT DETECTOR SYSTEM FOR DIRECT READ-WHILE-WRITE OPERATION ON MAGNETO-OPTIC MEDIA

[75] Inventors: Blair I. Finkelstein; Morovat B. Tayefeh, both of Tucson, Ariz.

[73] Assignee: International Business Machines, Inc., Armonk, N.Y.

[21] Appl. No.: 990,607

[22] Filed: Dec. 14, 1992

[51] Int. Cl.⁵ .............................................. G11B 7/00
[52] U.S. Cl. ........................................ 369/54; 369/59; 369/110; 369/116; 369/124
[58] Field of Search ................ 369/13, 50, 53-54, 369/58-59, 109-111, 116, 120, 124, 44.23, 44.24, 47-48

[56] References Cited

U.S. PATENT DOCUMENTS

| | | | |
|---|---|---|---|
| 4,583,210 | 4/1986 | Winslow | 369/54 |
| 4,599,717 | 7/1985 | Bracht et al. | 369/54 |
| 4,680,594 | 7/1987 | Bracht | 369/54 X |
| 4,698,695 | 10/1987 | Kosaka et al. | 369/54 X |
| 4,787,075 | 11/1988 | Matsuoka et al. | |
| 4,819,220 | 4/1989 | Miyazaki et al. | 369/50 X |
| 4,833,662 | 5/1989 | Yoda | 369/54 X |
| 4,949,311 | 8/1990 | Barnard | 369/54 |
| 4,974,219 | 11/1990 | Korth | 369/13 |
| 5,036,505 | 7/1991 | Gleim | 369/54 X |
| 5,111,442 | 5/1992 | Nakajima et al. | 369/54 X |
| 5,233,592 | 8/1993 | Suzuki et al. | 369/54 X |
| 5,235,580 | 8/1993 | Ogino | 369/54 X |

Primary Examiner—W. R. Young
Attorney, Agent, or Firm—Greenlee and Winner

[57] ABSTRACT

An optical disk drive apparatus includes a magnet-optic optical disk, laser generator, optical system, first and second photodetectors, data detecting and amplifying device connected to the photodetectors and a laser generator control device. The photodetectors each have first and second detecting sections receiving leading and trailing light beam segments, respectively, and each photodetector producing a magnitude proportional output signal. The control device includes a mode setting device for operating in a read only mode using both first and second sections and a read while performing a write mode using only the second sections.

1 Claim, 2 Drawing Sheets

SPLIT DETECTOR SYSTEM FOR DIRECT READ-WHILE-WRITE OPERATION ON MAGNETO-OPTIC MEDIA

This invention relates to optical disk devices and, more particularly, relates to the verification of data while writing the data on magneto-optic media.

BACKGROUND OF THE INVENTION

Magneto-optical recording typically requires three disk revolutions to write new information on the disk. The first revolution is used to erase the media, the second, to write the information and the third, to read and verify that the write operation successfully recorded the data.

Various attempts have been made to reduce the overhead associated with an extra disk revolution for the read verify operation. U.S. Pat. No. 4,583,210, relates to an optical disk system where information is read back immediately after it is written. Two separate laser generators are provided; one for writing data and one for reading the data back.

U.S. Pat. No. 4,949,311, relates to an optical disk system with a single laser source to write on an optical disk and obtain a direct read-after-write. In order to accomplish the write and the read, a grate is used to split the laser beam into two beams. The first beam is focused onto the recording surface to generate a write spot, and the second beam is focused onto the recording surface to read back what has been written. The read spot is positioned some distance behind the write spot on the moving magnetic media; in essence, this approach involves the use of two laser beams although only one laser source.

Optical disk media is reactive to bursts of light such as can be produced by the rapid switching of a semiconductor laser. In order to write data on optical media, laser power is controlled to a fairly high power level in order that the media is heated and altered in accordance with an input data stream. In reading the data back, the laser power level is controlled to a lower level so that the media is not altered by the laser beam, but the reflected light indicates the presence or absence of media alterations in accordance with the recorded input data stream.

One type of erasable optical media is magneto-optic (MO) media, which is not permanently altered when data is written. In MO media, the magnetic orientation of the reactive material is altered in the writing process, and in the reading process the magnetic orientation is sensed. In writing data, the orientation of magnetic domains within a written mark on the media may take a north pole orientation to indicate a "0" digit, for example, while the magnetic orientation of the domain within a mark to indicate a "1" digit takes a south pole orientation. In the erasing process, the magnetic orientation is ordered such that the entire media takes the same orientation, for example, a north pole or "0" orientation.

When reading data from an MO optical disk, the remanent magnetization of one or the other polarity causes an angular displacement in the linear polarization of a reflected light beam according to the Kerr effect. The direction of angular displacement is dependent upon the north pole or south pole orientation of the media. When the reflected beam is split into its P and S polarization components, direction of the angular displacement of the light beam can be detected to produce an MO data signal in accordance with the recorded data.

In thermo-magnetic recording, a laser beam is focused to a spot on the surface of the optical disk. Heating of the reactive material of the disk results in a temporary softening of the remanent magnetization quality of the magnetic medium, so that through the application of an external magnetic field, the direction of magnetization can be set to either a north or a south polarity within the heated material. When the laser spot is removed, the medium cools so that the magnetic domains under the spot take either a north or a south polarity depending upon the direction of the external magnetic field applied during the heating process.

In order to write a succession of marks on MO media, the MO disk is moved at a constant velocity under the focused laser spot. During writing of a mark, the laser is energized to a relatively high level often accomplished through short, high power pulses interspersed with relatively long periods at the low power read level.

SUMMARY OF THE INVENTION

This invention is to the use of split detectors to sense the magnetic orientation of freshly written marks on the same cycle as the mark is written. The invention makes use of the rapidity with which MO optical media cools to a "hardened" magnetic state upon the removal of the write power level. A system is provided whereby a laser is switched repeatedly between write power levels and read power levels such that the desired magnetic orientation of the mark on the magnetic disk is reached within the first half of the laser spot as the media travels under the spot. In the trailing half of the spot, with the appropriate magnetic domain orientation firmly written, a reduction of laser power to the read level enables the reading of the just written mark. A photodetector system is provided whereby a first half of a split photodetector is aligned to detect the leading half of the light reflected from the laser spot, while a second half of the split photodetector is aligned to receive light reflected from the trailing half of the laser spot. By limiting the read operation during a read-during-write operation to that portion of the photodetector that detects light from the trailing half of the laser spot, a system is provided which enables the reading of just written data.

BRIEF DESCRIPTION OF THE DRAWING

FIG. 3 is an idealized representation of a laser spot recording a mark on an optical disk.

DETAILED DESCRIPTION

Figure 1:
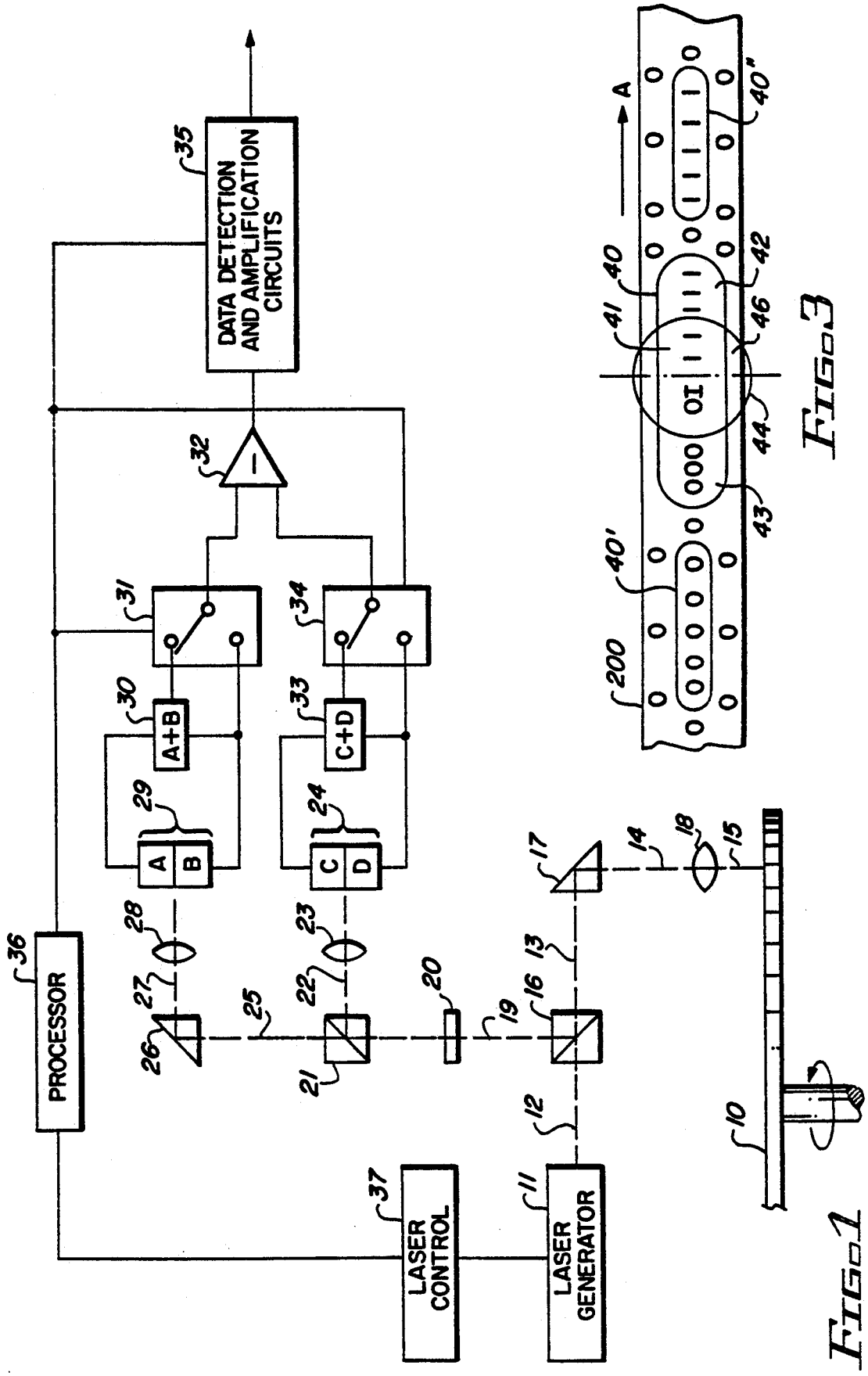
FIG. 1 illustrates the system of the current invention.

When reference is made to the drawing, like numerals will indicate like parts and structural features in the various figures.

FIG. 1 shows the optical disk system of this invention, with an optical disk 10, mounted for rotation in an optical disk playback/recorder, the mechanical details of which are not shown. A laser generator assembly 11 produces a light beam which travels over light paths 12–15 to the surface of the disk 10. The optical system which directs the light to disk 10 includes beam splitter 16, prism 17 and focusing lens 18. Light reflected from disk 10 passes over light paths 15, 14 and 13 to polarizing beam splitter 16, where the beam is reflected over light path 19 through quarter-wave plate 20 to beam splitter 21. The P+S component of the reflected beam is reflected over light path 22 through focusing lens 23 onto the photodetector 24, which is comprised of two sections; C and D. The P-S component of the reflected light beam is passed over light path 25 to prism 26, where it is reflected over light path 27 to lens 28 which focuses the P-S component of the beam onto photodetector 29 which is comprised of two sections; section A and section B. The output of photodetector 29 is sent to circuit 30 where the two signals output from the two separate photodetector sections A and B are summed together. Switch 31 selects either the summed output from both sections 29A and 29B, or the output of section 29B only, and passes the selected output signal to differential amplifier 32.

The output signals of photodetector 24, both sections C and D, are sent to summing circuit 33. Switch 34 selects either the summation of the entire output of photodetector 24, that is the output from both sections C and D, or the output of section D only. Whichever output signal of the photodetector 24 is selected, that output signal is sent to differential amplifier 32. The output of amplifier 32 representing either the predominant P+S component or the predominant P-S component of the optical signals received by the photodetectors 29 and 24 is sent to the data detection and amplification circuits 35 for processing the detected signals into a data pulse stream for presentation to the unit requesting the data. All components of the circuit operate under the control of processor 36. Processor 36 is connected to switches 31 and 34 which operate to select the desired output. Laser control circuit 37 acts to control the power level supplied to laser 11 in accordance with instruction from processor 36. Laser generator 11 responds to the laser control 37 to produce either a relatively high write power light beam or a relatively low read power light beam over light path 12.

Figure 2:
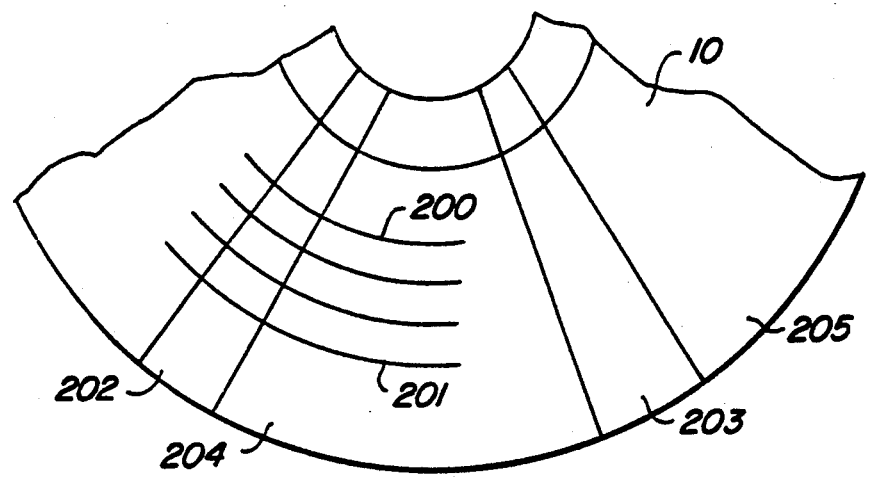
FIG. 2 is a schematic representation of sectors, tracks, sector headers, and user areas on a section of a typical optical disk for use with the apparatus of FIG. 1.

FIG. 2 is a schematic representation of a portion of the surface of disk 10, and shows various tracks 201 on the surface of the disk, together with sector header regions 202 and 203 which are situated between user areas 204 and 205. For an MO disk, the magneto-optic region, that is the erasable region, is the user area 204 and 205. Tracks may be concentric or, preferably, may be formed in a continuous spiral convolution. Sector header regions 202 and 203 are, at the current time, permanently inscribed with data identifying the particular track and sector, and with the sector mark. There are more complicated optical disk formats proposed which involve banded media to increase the capacity of the disk. With that type of format, the media is divided into annular bands. In each of these bands a frequency at which data is recorded is scaled according to the approximate diameter of each band so that the recording density is a constant at the inner-diameter of each band. In some banded formats, the headers are not radially aligned, as shown in FIG. 2. However, the inventive system herein does not depend upon the format of the disk, and FIG. 2 is provided solely as an aid to comprehension and not as a limiting schematic representation of tracks, sectors and headers.

FIG. 3 is an idealistic representation of a mark written on a track. During operation, the optical disk is rotated under the incident laser generated beam, such that the focused laser spot 41 can be raised to the write power level and heat an area of the track generally corresponding to an elliptical outline represented by mark 40. Within that heated area, the reactive material can be made subject to an externally applied magnetic field in order to orient the magnetic material within the mark to one of two orientations; a first orientation corresponding to a "0" digit and a second orientation corresponding to a "1" digit. In that manner, by controlling the application of write power to the laser, and by controlling the direction of the applied external field, marks representing a succession of 1 and 0 digits can be generated within each track of the optical disk. In FIG. 3 a representative track 200 is shown with a mark 40 thereon, together with a succeeding mark 40'. and a preceding mark 40". The area between marks is shown populated with 0 digits, that is, the background area of the track outside the marks has previously been heated and oriented to represent a 0 digit. In the particular example shown in FIG. 3, the preceding mark 40" has also received a 1 digit orientation and the succeeding mark 40', yet to be written, currently has a 0 digit orientation. Mark 40, however, is in the process of being written with a polarization indicating a 1 digit. As represented in FIG. 3, the leading portion 42 of mark 40, already written, has received a 1 digit orientation. The trailing portion 43 of mark 40, still to be written, has a 0 digit orientation. The portion of the mark currently, under laser spot 41, shows the transition from a 0 digit representation to an indeterminant representation I to a 1 digit orientation. The portion 45 of laser spot 44 represents the leading half of laser spot 44 in the sense that the leading portion 45 is the first half of the laser spot operative to heat the mark. The trailing half 46 of spot 44 acts to write or read, as the case may be, a portion of the mark which has already received sufficient energy to cause the magnetic domains to take the desired orientation; in this case, to represent a 1 digit.

FIG. 3 illustrates the concept of utilizing light reflected from the trailing half 46 of spot 44 to read what has just been written.

Figure 4:
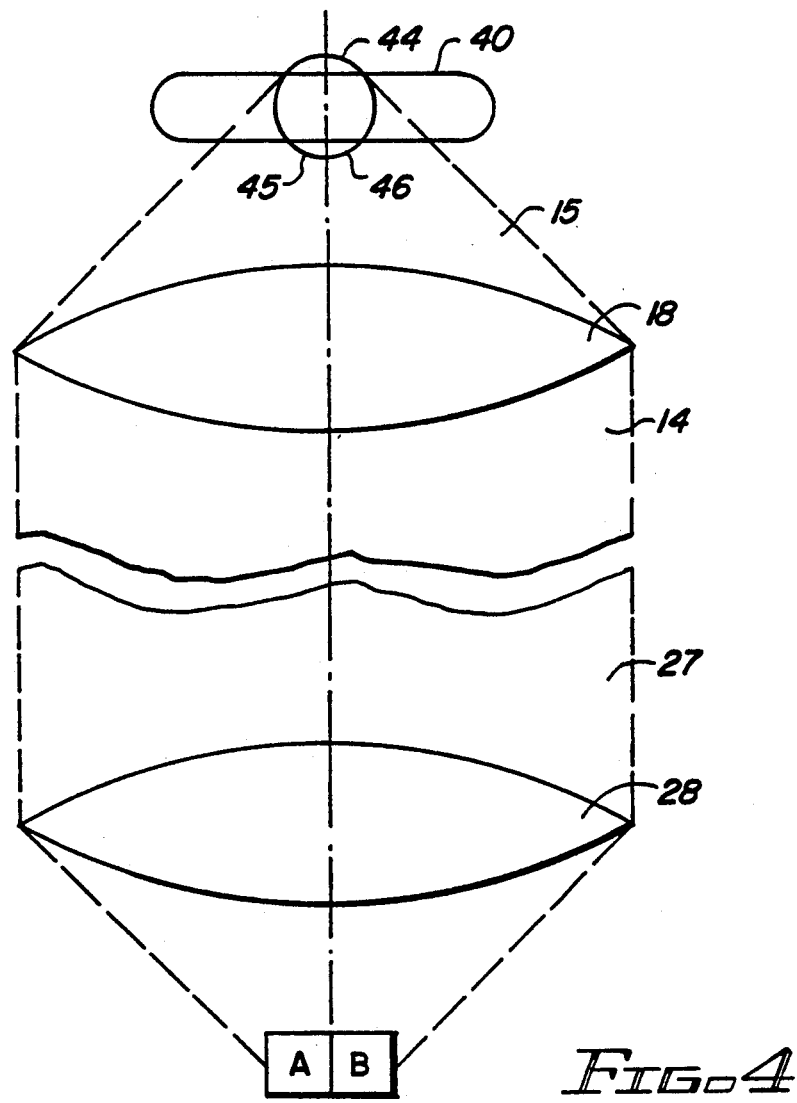
FIG. 4 is a representation of the alignment necessary for separately detecting the leading and trailing portions of light reflected from the laser spot.

FIG. 4 illustrates that light reflected from the trailing portion 46 of spot 44 is reflected over light path 15 to lens 18 where the beam is then passed in a collimated fashion through the remainder of the optical components, including polarizing beam splitter 16, quarter-wave plate 20, beam splitter 21 and prism 26 to lens 28. At lens 28, the beam contains only, for example, the P-S component of the reflected beam. The P-S component is focused by lens 28 onto photodetector 29 with the light reflected from the trailing portion 26 of spot 44 focused onto section B of photodetector 29. Similarly, the light system will focus light from leading portion 45 of spot 44 onto section A of photodetector 29.

The P+S component of the light reflected from spot 44 is focused by lens 23 onto sections C and D of photodetector 24 in exactly the same fashion as represented for the P-S component in FIG. 4. As a consequence, section D of photodetector 24 will receive light reflected from the trailing portion 46 of spot 44 in the same manner that section B of photodetector 29 received light from the trailing portion 46. With reference to FIG. 3, it can be seen that light reflected from the trailing portion 46 is representative of the data which has been written during the write event. As a consequence, by aligning photodetector sections B and D to receive light from the trailing half of the laser spot, it is possible to read and verify what has been written during a write cycle.

In addition to the proper alignment of the photodetectors 29 and 24, it is also necessary to produce a mark in which the freshly oriented magnetic properties have cooled sufficiently to be reliably read during the time in which a written mark is still under the laser spot.

As explained above, when performing a direct read-after-write operation, it is desired to read from only the trailing half of the laser spot. As a consequence, with reference to FIG. 1, the output of photodetector 29D is directed to differential amplifier 32 through switch 31 while the output of photodetector 24D is directed to differential amplifier 32 through switch 34. Switches 31 and 34 are controlled by mode setting processor 36 such that during the direct read-after-write mode switches 31 and 34 are oriented properly.

It should be noted that since only one portion of the reflected beam is used for reading in the read-after-write process, the read signal amplitude is reduced. While this reduces the signal-to-noise ratio, there is no loss in the ability of detecting the Kerr effect signal because of the pairing of the two detectors. Loss in signal-to-noise ratio is reasonably insignificant, acting as a stress read. In that manner, if the verification is accurately performed by reading from only a portion of the entire spot, a normal read operation utilizing the entire spot is more likely to read the information without difficulty.

For a normal read operation, both halves of the photodetectors 24 and 29 are used. In that case, the output of summing circuits 30 and 33 are selected by mode setting processor 36 through switches 31 and 34 to provide signal outputs to the differential amplifier 32. In the normal read mode, therefore, the entire signal from laser spot 44 is utilized.

While the invention has been described above with respect to specific embodiments, it will be understood by those skilled in the art that various changes in form and details may be made therein without departing from the spirit and scope of the invention which receives definition in the following claims.

We claim:

1. An optical disk drive apparatus including a magneto-optic (MO) optical disk, said disk containing a succession of separated marks written on the disk, said marks representative of stored binary data, motive means for moving said disk, a laser generator, an optical system for focussing light output from said laser generator onto the surface of said optical disk, said focussed light forming an illuminated spot on said surface whereby said marks on said disk are moved in succession under said spot, said optical system also conducting light reflected from said surface to components for separately producing first and second light signals, a light detector circuit for individually receiving the separated light signals, said detector circuit capable of separately detecting the leading and trailing segments of reflected light distribution from said spot as said marks move under the spot, comprising:

a first photodetector optically connected to receive said first light signal from said optical system;

a second photodetector optically connected to receive said second light signal from said optical system;

data detecting and amplifying means connected to said first and second photodetector means for producing a data pulse train in accordance with signals received from said first and second photodetectors;

control means connected to said laser generator for controlling the application of power to said generator at read or write levels;

said first photodetector comprised of two separate detecting sections, a first section for receiving the leading segment of the reflected light beam and for producing an output signal proportional to the magnitude of said leading segment, and a second section for receiving the trailing segment of said reflected light beam and for producing an output signal proportional to the magnitude of said trailing segment;

said second photodetector comprised of two separate detecting sections, a first section for receiving the leading segment of the reflected light beam and for producing an output signal proportional to the magnitude of said leading segment, and a second section for receiving the trailing segment of said reflected light beam and for producing an output signal proportional to the magnitude of said trailing segment;

said control means including mode setting means for operating said apparatus in a read only mode (RO mode) and in a read while performing a write mode (RDW mode), said mode setting means connected to said first and second photodetectors to enable both first and second detecting sections for said RO mode, and for enabling only said second sections for said RDW mode.

* * * * *